United States Patent [19]

Wilbur

[11] 4,145,294
[45] Mar. 20, 1979

[54] LIQUID PHASE SEPARATOR WITH VALVED OUTLET MEANS

[75] Inventor: Milton S. Wilbur, St. Louis County, Mo.

[73] Assignee: Elizabeth S. Jablecki, La Jolla, Calif.

[21] Appl. No.: 838,814

[22] Filed: Oct. 3, 1977

[51] Int. Cl.² ............................................. B01D 23/28
[52] U.S. Cl. ................................. 210/419; 210/474; 251/229; 251/231; 251/261
[58] Field of Search .............. 210/419, 470, 471, 474; D7/68, 47; 251/279, 318, 8, 231, 229, 261, 84, 85

[56] References Cited

U.S. PATENT DOCUMENTS

| | | | |
|---|---|---|---|
| 66,127 | 6/1867 | Catlin | 210/419 |
| 66,371 | 7/1867 | Cann | 210/419 |
| 130,302 | 8/1872 | Lawrence | 210/419 |
| 174,823 | 3/1876 | Koons | 210/419 |
| 1,091,271 | 3/1914 | Berger | 210/419 |
| 1,734,841 | 11/1929 | Walden | 210/474 |
| 1,964,836 | 7/1934 | Wheaton | 251/231 |
| 2,057,231 | 10/1936 | Dawson | 251/231 |
| 2,188,783 | 1/1940 | Voight | 251/231 |
| 2,544,160 | 3/1951 | Hinrichs | 251/261 |
| 2,553,991 | 5/1951 | Wagner et al. | 251/231 X |
| 2,839,082 | 6/1958 | Moore et al. | 251/279 |
| 2,885,174 | 5/1959 | Setka | 251/279 |
| 4,031,032 | 6/1977 | Jablecki | 210/474 |

FOREIGN PATENT DOCUMENTS

| | | | |
|---|---|---|---|
| 748809 | 7/1933 | France | 251/261 |
| 2273573 | 7/1976 | France | 210/474 |
| 12223 | 6/1903 | United Kingdom | 210/419 |

Primary Examiner—Charles N. Hart
Assistant Examiner—Benoit Castel
Attorney, Agent, or Firm—Ralph W. Kalish

[57] ABSTRACT

A separator for immiscible, emotionless-forming liquids having different specific gravities which comprises a container and a valve arrangement provided in the lower end of the vessel for movement between open and closed conditions whereby through disposition in the container, the heavier liquid may be discharged from the separator, the lighter liquid being retained therein. The valve configuration is such as to greatly facilitate its disassembly in cleaning as well as economic manufacture.

5 Claims, 7 Drawing Figures

U.S. Patent     Mar. 20, 1979     4,145,294
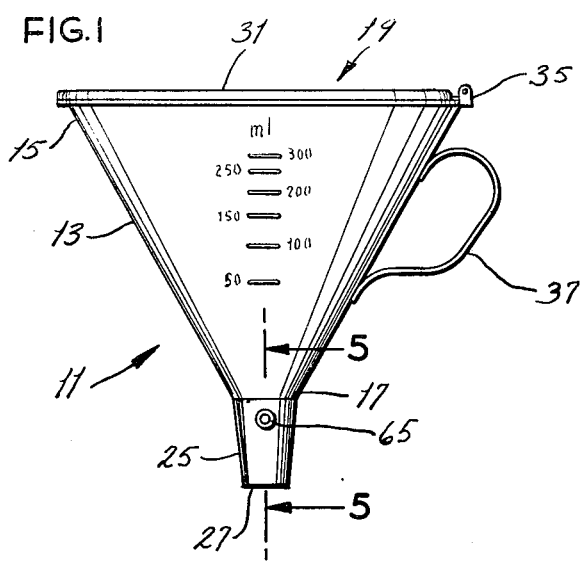
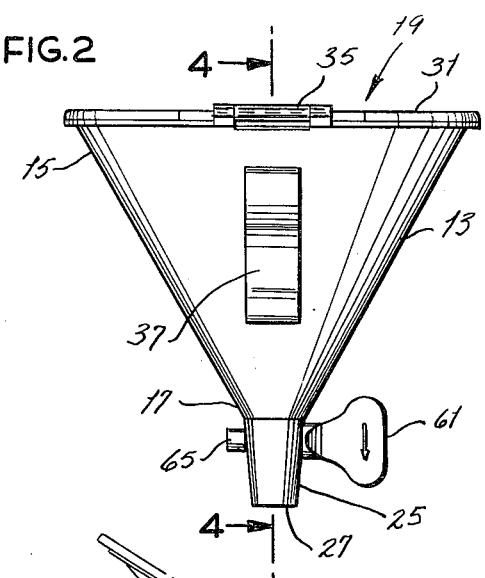
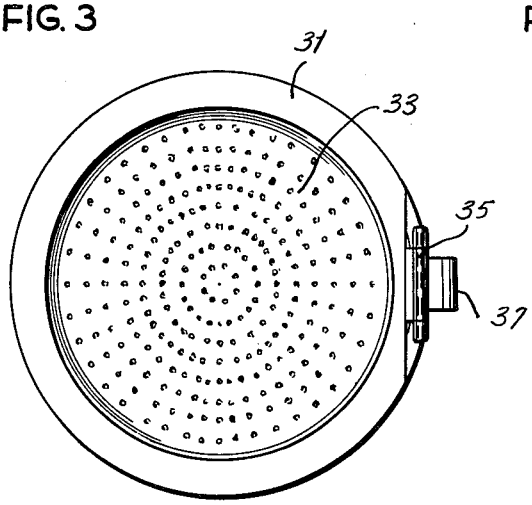
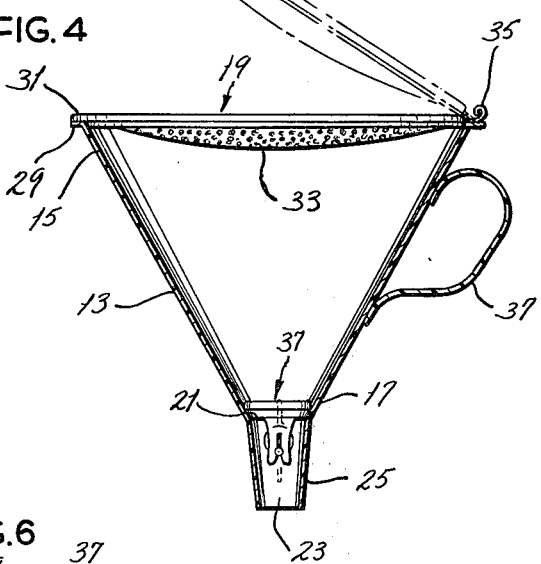
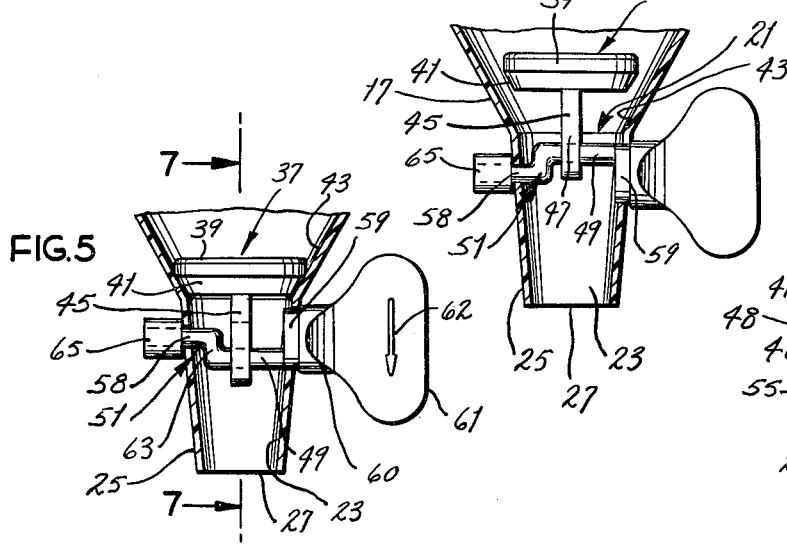
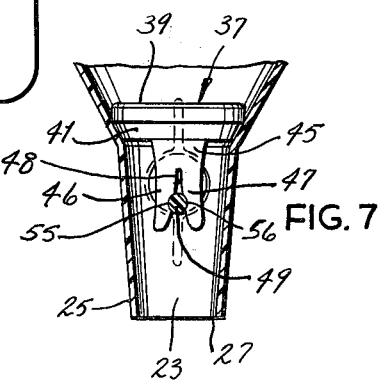

LIQUID PHASE SEPARATOR WITH VALVED OUTLET MEANS

BACKGROUND OF THE INVENTION

This invention relates in general to separators and, more particularly, to a so-called liquid-liquid separator.

Separators of the present nature have been proposed which are adopted to effect the separation of one liquid from another wherein the same are immiscible, do not form an emulsion, and have different specific gravities. Such separators have greatly facilitated the separation of such liquids. One such separator is disclosed in co-assigned U.S. Pat. No. 4,031,032, issued June 21, 1977, of Elizabeth S. Jablecki.

One difficulty which has been encountered in separators of the prior art is that they are not readily amenable to disassembly and cleaning after use.

It is also desirable to make such separators of the present character more readily suited to mass production manufacturing techniques by utilizing readily assembled integral subassemblies of resilient pre-molded plastic or synthetic resin materials, such molding being by injection molding or the like. All such materials, including polymers, are referred to herein simply as plastic materials.

SUMMARY OF THE INVENTION

It is an object of the present invention to provide a separator adapted to readily effect the separation of one liquid from another wherein the same as immiscible, do not form an emulsion, and have different specific gravities.

It is a further object of the present invention to provide a separator of the character stated which is of a readily and most easily disassembled nature so as greatly to facilitate its cleaning.

It is also an object of the present invention to provide a separator of the character stated which is of a nature such that simple integral subassemblies of pre-molded synthetic resin material may readily be fitted together to provide a finished separator.

It is another object of the present invention to provide a separator of the character stated having a general configuration and incorporating a novel valve configuration so as to inhibit the likelihood of removal or flow through the container during separation of matter other than the liquid intended to be separated.

It is another object of the present invention to provide a separator of the character stated which embodies a valve arrangement which is easily manipulated and which is of simple, foolproof and durable construction.

It is a further object of the present invention to provide a separator of the character stated which is extremely versatile in usage, having relatively wide application; which is especially suitable for domestic purposes; which is amenable to high volume, low cost production; and which is long lasting in usage.

BRIEF DESCRIPTION OF THE DRAWINGS

FIG. 1 is a front elevational view of a liquid separator constructed in accordance with and embodying the present invention.

FIG. 2 is a side elevational view of the separator.

FIG. 3 is a top plan view of the separator as shown in FIG. 1.

FIG. 4 is a vertical transverse sectional view taken along line 4—4 of FIG. 2.

FIG. 5 is a side view in partial section taken along line 5—5 of FIG. 1 and illustrating a valve means of the present invention with a closure member thereof shown in closed lower position.

FIG. 6 is a vertical transverse sectional view similar to FIG. 5 but illustrating the closure member in an open, upper position.

FIG. 7 is a vertical transverse sectional view taken along line 7—7 of FIG. 5.

DESCRIPTION OF THE PREFERRED EMBODIMENT

Referring now to the drawings which illustrate the preferred embodiment, designated generally at 11 is a liquid separator of the present invention which is shown as having a liquid receiving body 13 of generally inverted conical contour, tapering uniformly inwardly from a relatively enlarged upper end portion 15 down to a lower end portion 17 having a substantially reduced diameter, so as to provide a sloping interior surface. A relatively large opening 19 is provided in the upper end portion 15 for entry of immiscible liquids to be separated.

The reduced cross section lower end portion 17 provides a relatively small discharge opening 21 communicating with the interior 23 of a short tubular extension or fluid discharge conduit portion 25 having an outlet 27. Both the volume of body 15 and the length of the fluid discharge conduit or extension 25 are matters of choice which are dependent upon the quantity of the batch of liquid to be subjected to separation and the vessel or other container into which fluids are to be separated.

At the upper end portion 15 of body 13 of the vessel is provided an outwardly extending short integral flange or skirt 29 upon which may be disposed the rim 31, as of wire or molded synthetic resin material or the like, of a strainer 33 of a suitable mesh size for withholding solid matter entrained in the liquid mass to be subjected to separation. Strainer 33 is retained upon body 13 by means of a hinge 35 mounting the strainer adjacent the upper end portion 15 of body 13 for swingable movement of the strainer 33 in a vertical plane between operative disposition across opening 19 and inoperative position disposed therefrom. Swinging movement of strainer 33 is illustrated in FIG. 4. The body 13 also includes a handle 37 of customary design secured to the exterior surface of body 13 to provide the user with means for manipulating the separator.

Referring now particularly to FIGS. 5–7, a separator of the present invention is provided with a valve configuration comprising a closure member designated generally 37 having a body portion 39 of circular cross section with a tapered or sloping shoulder 41 so as to provide a tapered peripheral surface for creating a sealingly contiguous relationship between such surface and the corresponding slope interior surface 43 of container body 13 proximate discharge opening 21. As will be seen, closure member 37 is movable between a closed, lower position shown in FIGS. 5 and 7 providing a sealingly contiguous relationship between surfaces 41 and 43, and an open, upper position providing for a peripherally non-contiguous or spaced relationship between the periphery of shoulder 41 of the closure body 39 and corresponding interior surface 43 of the separator. In the closed, lower position shown in FIGS. 5 and 7, the sealingly contiguous relationship prevents liquid in the container from flowing through discharge opening 21. On the other hand, in the open, upper position of the closure member shown in FIG. 6, flow of liquid is permitted by a rather large area spacing around the shoulder 41 of the closure member and through discharge opening 21, and thence downwardly through the interior 23 of fluid discharge conduit or extension 25.

Integrally formed with the body 39 of closure member 37 is an extension portion 45 which extends downwardly into the interior 23 of the discharge conduit 25. Extension 45 is bifurcate in nature and has a spaced pair of legs 46,47 remote from body portion 39 to provide a slot 48 such that the legs straddle the crank pin 49 of a crankshaft which is designated generally 51. An area of cross section relief is provided for journalling the extension 45 on crank pin 49 by oppositely disposed arcuate notches 55,56 in the oppositely disposed surfaces of slot 48 which are presented proximally with respect to the lowermost extremities of legs 46,47. Crankshaft 51 is of unitary, i.e., integral, construction and extends transversely across fluid discharge conduit 25 with opposite ends 58,59 journalled respectively apertures of the opposite walls of fluid discharge conduit 25.

Crankshaft 51 extends transversely outwardly from fluid discharge conduit 25 as an enlarged diameter handle portion 60 widening into a relatively thin paddle-shaped handle 61 having, if desired, an arrow or other marking 62 molded therewith or otherwise applied to it for indicating proper positioning of the handle for desired operation. The handle, of course, permits manual rotation of the crankshaft so as to permit movement of the closure body between its upper and lower positions. As will be seen, the crank pin 49 is at its lowermost position when closure member 37 is in its lower, closed position preventing flow of fluid past closure body 39, and the throw of crankshaft 51 provides movement of the closure body between lower and upper positions.

The construction of crankshaft 51 is such as to greatly facilitate its prefabrication and assembly into a finished separator. For this purpose, the journalled portion 59 of the crankshaft is of a substantially enlarged diameter, preferably substantially at least as great as the throw of the crankshaft thereby to facilitate fitting of the crankshaft within the fluid discharge conduit. The crank pin 49 extends transversely from this enlarged diameter portion 59, at a point spaced from the crank shaft axis of rotation, toward the proximate interior wall of the fluid discharge conduit toward its opposite interior wall. Accordingly, the enlarged diameter portion 59 of the crankshaft constitutes a crank arm for crank pin 49. The crankshaft is seen to have also a second crank arm 63 which integrally joins crank pin 49 and journalled portion 58 of the crankshaft. The latter portion extends transversely outwardly from fluid discharge conduit 25 so as to provide sufficient length for the securing thereto of a captive ferrule 65 of diameter greater than that of the aperture in which portion 58 of crankshaft 51 is journalled. Ferrule 65, when secured in place, accordingly prevents the crankshaft from being withdrawn from fluid discharge conduit 25. Similarly, enlarged diameter portion 60 prevents shifting of the crankshaft in the opposite direction. Means other than a ferrule, such as a boss, spring clip or the like may be used to maintain the shaft in place.

Although strainer 33 may be of aluminum, plastic, or other materials, preferably the major subassemblies or elements of the present strainer are constructed of premolded plastic material of a resilient nature and advantageously may be formed of injection molded thermoplastics such as polystyrene, polyethylene, polypropylene, polycarbonate, nylon, polychlorotrifluoroethylene, polytetrafluorethylene and ABS or may be molded in other manners using various thermosetting plastics constituted of suitable synthetic resin materials. Accordingly, the body 13 and its integral extension or fluid discharge conduit 25, as well as handle 37, the rim of 31 of the strainer, crankshaft 51 and closure member 37 each may comprise an integral unit of premolded plastic material of the character described above.

In usage, strainer 19 is utilized in a so-called liquid-liquid separation wherein the liquids to be separated are immiscible, do not form an emulsion, and possess different specific gravities. Thus, for instance, an oil and water mixture would be readily amenable to separation by the present invention since with closure member 37 in its closed condition, vessel body 13 would be supplied with the particular mixture and upon completion of the separation, as may be readily visually detected, handle 60 may then be manipulated to permit flow of the water through discharge opening 21 and out through the fluid outlet 27 and into a suitable receptacle until the line of demarcation between the water and oil strata has descended to a point immediately above closure member 37 whereupon the latter may be lowered by operation of handle 60 to inhibit further flow.

It may be noted in this regard it may be desirable to employ one of the many thermoplastics or thermosetting plastics for forming the vessel which are of a transparent, semi-transparent or translucent nature so as more readily to facilitate determination of a line of demarcation between the strata of the immiscible liquids which are to be introduced into the container of the separator.

The separator is thus seen to be well suited for widespread utilization for laboratory purposes wherein it is desirable to effect separation of various liquids which are the foregoing criteria.

On a more domestic level and for general culinary purposes, it will be appreciated that the present invention has wide application in a kitchen wherein it is desired to separate fat or grease from meat juices, soup stock, and the like. In this regard, it should be particularly noted that strainer 33 readily facilitates withholding any solid matter, such as vegetables or the like, entrained in the liquid mass to be subjected to separation. Also, the nature of closure member 39 is such as to greatly provide unimpeded flow of the separated liquid having the greater specific gravity and, to this extent, provides a generous clearance between the peripheral surface 41 of closure member 39 and the corresponding interior surface 43 of container 13 when in the open, upper position shown as in FIG. 6.

It may also be noted that, due to the resilient nature of legs 46,47 of extension 45 of the closure member 37, a degree of freedom permitting desirable lateral movement of closure body 39 is achieved, such being desirable from the standpoint of permitting particulate matter of a heavy nature, such as bone fragments, etc., to pass unimpeded through fluid discharge conduit 25 with the liquid of greater specific gravity to be separated from that of lighter specific gravity which is to be retained within separator body 13.

A significant advantage results from the ease of disassembling the valve configuration, nothing that the resilient nature of legs 46,47 permits resilient deformation so that the closure member 37 may, by simply lifting it, readily be separated from crank pin 49 for purposes of cleaning not only of the closure member but also permitting the user to introduce a brush or cleaning cloth within fluid discharge conduit 25 and around the surfaces of crankshaft 51 and its pin 49.

Accordingly, it will be seen that the several objects of the invention are achieved and other advantages are attained.

Since various changes in the constructions herein described may be envisioned without departing from the scope or spirit of the invention, it is intended that all matter contained in the foregoing description shall be interpreted as illustrative rather than in a limiting sense.

Having described my invention, what I claim and desire to obtain by Letters Patent is:

1. A device for separating immiscible liquids having different specific gravities and different visually determinable characteristics comprising a container having an upper end portion and a lower end portion, said container having a relatively large opening in the upper end portion thereof for entry of immiscible liquids to be separated, said container having a relatively small discharge opening in the lower end portion thereof, said lower end portion being of reduced cross section relative to the upper end portion and said lower end portion having a fluid discharge conduit portion extending downwardly from said discharge opening with the interior of said conduit portion communicating with said discharge opening, and valve means for selectively opening and closing to permit liquid flow through said lower end portion and out said discharge opening to prevent such flow respectively, said valve means comprising a closure member constituted by an integral unit of premolded plastic material, said closure member being positioned above said discharge opening and comprising a body portion having a configuration providing for peripherally sealing contiguous relationship between the periphery of said closure body and corresponding interior surface of said container proximate to said discharge opening, said closure body being movable between a lower position providing said sealingly contiguous relationship and an upper position providing for peripherally noncontiguous relationship between the periphery of said closure body and corresponding interior surfaces of said container portion, said sealingly contiguous relationship preventing liquid in said container from flowing through said discharge opening, said peripherally noncontiguous relationship providing for flow of liquid through said discharge opening and downwardly through said fluid discharge conduit, said closure member having an integrally formed extension portion of a resilient nature extending downwardly from said closure body and into the interior of said fluid discharge conduit, and actuator means cooperable with said fluid discharge conduit interconnected with said closure member extension, and normally actuatable from outside said fluid discharge conduit, for selective movement of said closure body between said lower and upper positions, said actuator means comprising a crankshaft constituted of an integral unit of premolded plastic material, said crankshaft having opposite ends journalled respectively in opposite walls of said fluid discharge conduit and extending transversely thereacross, at least one crank arm integral with said shaft, and a crank pin carried by said crank arm, said closure extension being bifurcate in nature and having a spaced pair of legs remote from said closure body and including oppositely disposed surfaces between said legs defining a slot opening downwardly between said legs, said spaced legs straddling said crank pin, said slot having a relieved area proximally of the lowermost extremities of said legs and providing a cross section for accomodating said crank pin for journalling said closure extension on said crank pin, said relieved area being constituted by oppositely disposed arcuate notches in said oppositely disposed surfaces for resiliently engaging said crank pin, whereby selective rotation of said shaft causes said movement of said closure body, and whereby said closure extension may be readily selectively disengaged from said crank pin by lifting said closure member to cause resilient deformation of said legs permitting withdrawal of said crank pin from said slot.

2. A device as defined in claim 1 and further characterized by said container having a cross section which diminishes from said relatively large opening to said discharge opening to define a sloping interior surface proximate to said discharge opening, said body portion having a tapered peripheral surface adapted to conform sealingly to said sloping interior surface when said closure body is in said lower position, said crank pin being at a lowermost position when said closure member is in said lower position, the throw of said crankshaft causing movement of said closure body to mid upper position, said crankshaft having a portion extending transversely outwardly from said fluid discharge conduit for permitting normal rotation of said crankshaft.

3. A device as defined in claim 1 and further characterized by said crankshaft having a portion extending transversely outwardly from said fluid discharge conduit for permitting manual rotation of said crankshaft, said crankshaft being journalled in said fluid discharge conduit at a journal location between said crank pin and said outwardly extending portion, said crankshaft having an enlarged diameter portion at said journal location rotatable in a closely fitted aperture in a wall of said fluid discharge conduit, said enlarged diameter portion having a diameter substantially at least as great as the throw of said crankshaft, thereby to facilitate fitting of said crankshaft within said fluid discharge conduit.

4. A device as defined in claim 3 and further characterized by said crank pin extending transversely from said enlarged diameter portion at a point spaced from the crankshaft axis of rotation, said crank pin extending from one interior wall of said fluid discharge conduit toward the opposite wall, whereby said enlarged diameter portion constitutes said crank arm.

5. A device as defined in claim 1 and further characterized by said strainer means provided for disposition across said relatively large opening and hinge means mounting said strainer means on said container for swingable movement of said strainer means in a vertical plane between operative disposition across said relatively large opening and inoperative position displaced therefrom.

* * * * *

UNITED STATES PATENT OFFICE
CERTIFICATE OF CORRECTION

Patent No. 4,145,294  Dated March 20, 1979

Inventor(s) Wilbur Milton Swanson

It is certified that error appears in the above-identified patent and that said Letters Patent are hereby corrected as shown below:

In the heading [75] Inventor: "Milton S. Wilbur" should be --- Wilbur M. Swanson ---.

Signed and Sealed this

Twelfth Day of June 1979

[SEAL]

Attest:

RUTH C. MASON
Attesting Officer

DONALD W. BANNER
Commissioner of Patents and Trademarks